Nov. 24, 1936.  A. DE MUYNCK  2,061,867

AUTOMATICALLY VARIABLE SPEED TRANSMISSION

Filed Jan. 19, 1935  2 Sheets—Sheet 1

Inventor:
Alphonse De Muynck.
per: J. Levern
Attorney.

Nov. 24, 1936.   A. DE MUYNCK   2,061,867
AUTOMATICALLY VARIABLE SPEED TRANSMISSION
Filed Jan. 19, 1935   2 Sheets-Sheet 2

Patented Nov. 24, 1936

2,061,867

UNITED STATES PATENT OFFICE 2,061,867

AUTOMATICALLY VARIABLE SPEED TRANSMISSION

Alphonse De Muynck, Alost, Belgium

Application January 19, 1935, Serial No. 2,523
In Belgium January 22, 1934

5 Claims. (Cl. 74—260)

This invention relates to a driving power transmission with automatically variable speed, in which, for producing a driving moment or couple, use is made of the centrifugal inertia reaction of masses of mercury movable within the planet pinions of an epicyclic gear, of which the driving wheel and the sun-wheel are respectively fixed upon the driving shaft and upon the driven shaft of the apparatus.

In transmissions of this type known until now, the drawback exists that vibrations are produced and, moreover, they are not capable of producing a practically constant couple for a considerable series of speeds of rotation of the motor, as it is particularly desirable for transmissions in motor-cars.

The present invention eliminates these drawbacks.

According to the invention, the vibrations are eliminated when the transmission works as a speed reducer, by arranging the inner blades of the planet pinions, against which the centrifugal inertia of the masses of mercury reacts, in such a manner that, notwithstanding the rotation of the blades, which tend to move said masses within the circle described by the axis of the pinion, said masses will substantially remain outside said circle, permanently and in all the pinions at the same time. This elimination of noticeable movement of the masses prevents the appreciable variations of the inertia moment of the whole of the transmission and, consequently, the periodical oscillations and vibrations which are caused by the variations in the known constructions.

In order to appropriate the transmission to produce a practically constant couple for variable angular speeds of the motor, the invention provides moreover to construct the inner blades of the planet pinions in such a manner that they may oscillate or bend, so as to modify the useful capacity of the mercury containing cells bounded by said blades and in such a manner that the driving couple, at least starting from the base of average speeds, will only increase slowly, in order to allow the reduction of speed at all speeds of the motor normally used. It may be advantageous in this construction with movable blades, to give to the blades an initial inclination with respect to the radius of the pinion and in the normal direction of rotation thereof, so as to provide a rate of movability of the blades within the radial position.

The invention will be described with reference to the accompanying drawings illustrating some forms of embodiment of the invention, and in such drawings:

Fig. 5 illustrates diagrammatically a further modification, from which

Figure 1:
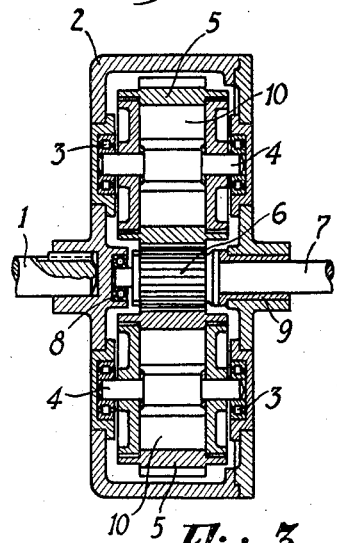
Fig. 1 is an axial section through the complete transmission device.

In Fig. 1, in which the complete apparatus has been illustrated, 1 designates the driving shaft upon which is fixed the casing 2 forming a fly-wheel, and which supports, in ball-bearings 3, the shafts 4 of the planet pinions 5. The latter directly mesh with the sun-pinion 6, fixed to the driven shaft 7, which is itself freely mounted within bearings 8 and 9 of the fly-wheel casing.

Each planet pinion 5 forms a cylindrical box, the crown of which is provided inwardly with radial blades 10 (Fig. 2), constituting with each other cells open in the direction of the center. The pinion box contains a quantity of mercury 12 which, when the fly-wheel 2 rotates at a determined speed and driving the pinions 5, tends to accumulate under the effect of centrifugal force, in the outer right-hand sector of the pinion box, as indicated by the interrupted hatchings in Fig. 2.

Presuming that the driven shaft 7 would be motionless or rotate at a lower speed than the driving shaft 1, the planet pinions 5 will rotate about their shafts 4, and their blades 10 will have to overcome the centrifugal inertia reaction of the mercury masses which tend to remain lodged in the outer right-hand sector of each pinion. The rotation of the pinions is thus retarded and a driving couple is produced, which tends to drive the sun-wheel 6 and the charged shaft 7.

Figure 2:
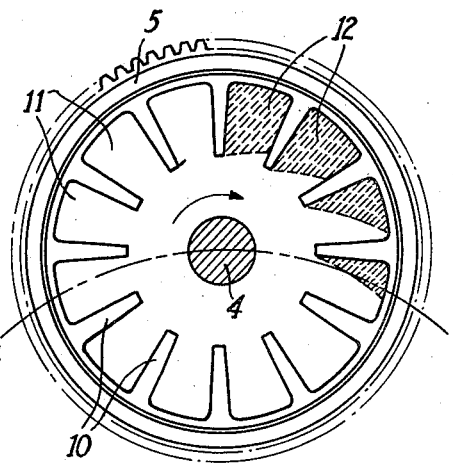
Fig. 2 illustrates a side elevation, on a larger scale, of the planet pinion, from which one flange has been removed to show the inner blades.

As illustrated in Fig. 2, the maximum capacity of the cells 11 is strictly limited, the free surface limiting the mercury being a cylindrical equipotential surface of balance, the center of which starting from the center of the pinion 6, is moved towards the center of the sun-wheel, according to the increase of the speed reduction. As a consequence, the mercury 12 is caused to flow continuously and progressively from one cell to the other, without being submitted to a noticeable movement under the effect of the rotation of the blades and in any case, without any important portion of the mass being drawn within the circle $x$ described by the shaft 4 of the planet pinion around the axis of the fly-wheel 2.

It results therefrom that no important modifications are produced in the moment of inertia of the fly-wheel containing the planet pinions and, consequently, no oscillations or vibrations of said fly-wheel will result therefrom, as is the case when the masses of mercury are moved completely within the circle $x$, as it has been previously proposed in apparatus of this type.

It is easily understood that, as long as the driving couple generated by the centrifugal inertia reaction of the masses 11 is deficient in moving the charged shaft 7 and the speed driving shaft, the planet pinions rotate about their axes while producing a speed reduction, but after synchronism has been obtained in the speeds of both shafts, the planet pinions become motionless and the whole transmission device rotates as a single block.

However, this means, used with rigid blades fixedly mounted, such as illustrated in the pinion according to Fig. 2, does not permit to produce a practically constant driving couple for the complete series of speeds of the driving shaft 1, owing to said steadiness of the blades. Thus a transmission provided with such planet pinions would not give satisfaction when used with motors having considerably variable running speeds, such as the motors of automobiles and the like.

Figure 3:
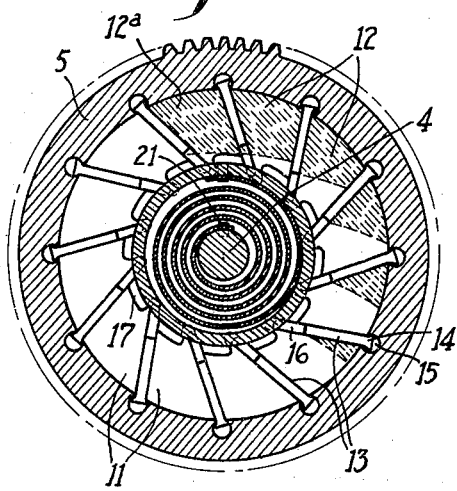
Fig. 3 is a similar view to that of Fig. 2, with a partial section illustrating a modified form of embodiment of such planet pinion.
Figure 4:
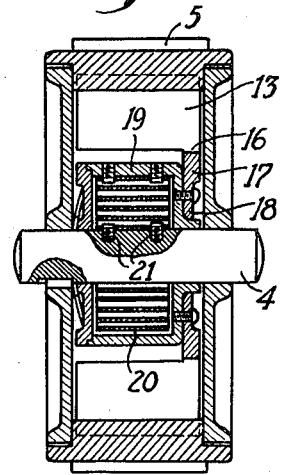
Fig. 4 illustrates an axial section of the planet pinion according to Fig. 3.

In the modified form of embodiment illustrated in Figs. 3 and 4, the blades 13 of the pinion are arranged so as to be capable of oscillating resiliently under the pressure of the mercury 12. For this purpose, they are provided with a head 14, forming a pivot spindle and lodged in a transverse groove 15 of the crown of the pinion, and their lateral tail portions 16 are engaged between two teeth 17 of a ratchet-wheel 18, fixed at the side of a spring barrel 19. The latter is freely mounted upon the shaft 4 of the pinion to which the spiral spring 20 is fixed at 21. To the spring 20 is given an initial tension which is sufficient to compensate the total thrust of the blades at the determined angular speed taken as a base for the average speeds.

Moreover, the blades 13 have a determined initial inclination with respect to the radial direction and in the direction of rotation of the planet pinion, and their heads 15 are off-set so as to limit the deviation of the blades in said direction.

It is obvious that by this arrangement of movable blades, the useful capacity of the cells 11 is variable according to the inclination of the blades and, inversely, to the rotation speed of the planet pinion. Up to the speed selected as a base for the average speeds, the useful capacity of the cells remains invariable, but beyond said speed, the thrust of the mercury upon the blades causes the spring 20 to give way and the blades oscillate and retain less mercury, as will be well understood by examining the cells at the right-hand side of Fig. 3. By the fact, the quantity of mercury 12a which is lodged in the outer left-hand sector of the planet pinion is increased and, by its centrifugal reaction opposite to that of the mercury lodged in the outer right-hand sector, partially neutralizes the reaction generating the driving couple.

Instead of being rigid and pivoting, the blades 13 may be flexible but fixedly mounted.

Figure 5:
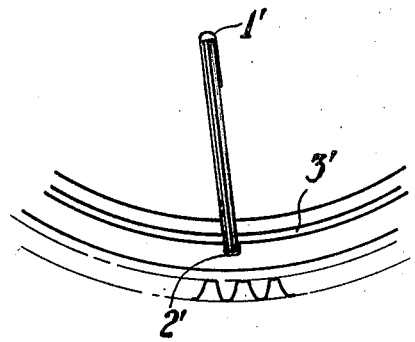
Figure 6:
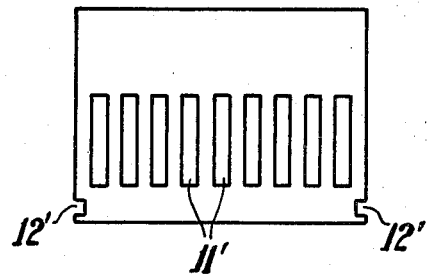
Fig. 6 shows a detail.

According to another possible form of embodiment mentioned, use is made of flexible blades fixedly mounted in the annular casing. In order to enable the blades to have considerable flexure without interfering with their solidity, each blade for instance is formed with a plurality of thin, elastic, superposed sheets, as illustrated in Fig. 5. All the sheets, except the two outer ones, are provided at the side of their clamping with a number of ports 11' (Fig. 6), intended to reduce the resistance to flexion. The front sheet is provided, at its free end, with an extension 1', bent over for the purpose of keeping the different sheets forming the blade close together, without preventing however said sheets from sliding the one over the other during their flexure. In order to enhance this movement, use can be made of a very consistant lubricant applied during the mounting of the apparatus between the sheets. The set of sheets are clamped in a groove 2' of the annular casing, and at their edge portion the sheets are provided with a notch 12' (Fig. 6). In accordance with these notches, the annular casing is provided with a circular groove 3' (Fig. 5), in which is arranged a ring capable of engaging said notches, so that the blades are prevented from sliding out of the curve.

In order to prevent that, at the starting moment, by considerable flexion of the blades, the mass of mercury be reduced too rapidly, the blades can be so mounted that they form an angle with respect to the radius forward in the direction of rotation of the planet pinion.

It is understood that the invention is not restricted to the forms of embodiment described herebefore by way of example, and that numerous modifications may be provided without departing from the scope of the present invention.

I claim:

1. In an automatically variable speed transmission constituted as an epicyclic gear provided with planet pinions formed as a hollow cylindrical body and having inwardly open cells formed by inner blades with masses of mercury reacting against said blades, the arrangement of said blades so as to be pivotally movable for the purpose of varying the useful capacity of the active cells inversely proportional to the angular speed of the pinions, the whole mass of mercury acting in a pinion remaining constant.

2. In an automatically variable speed transmission constituted as an epicyclic gear provided with planet pinions formed as a hollow cylindrical body and having inwardly open cells formed by inner blades with masses of mercury reacting against said blades, the arrangement of said blades so as to be movable for the purpose of varying the useful capacity of the cells inversely proportional to the angular speed of the pinions, resilient means being provided reacting against the mobility of the blades until a predetermined speed is reached by the pinion.

3. In an automatically variable speed transmission constituted as an epicyclic gear provided with planet pinions formed as a hollow cylindrical body and having inwardly open cells formed by inner blades with masses of mercury reacting against said blades, the arrangement of said blades with their outer edge pivoted to the crown of the planet pinion and their inner edge engaging a notched element coaxial to and movable with respect to the said crown against the action of resilient means fixed to the shaft of the pinion.

4. In an automatically variable speed transmission constituted as an epicyclic gear provided with planet pinions formed as a hollow cylindrical body and having inwardly open cells formed by inner pivotable or flexible blades with masses of mercury reacting against said blades, the arrangement of means capable of imparting to said blades an initial inclination forward to the radial position, for the purpose of having a slow variation of capacity of the cells when the blades start moving.

5. In an automatically variable speed transmission constituted as an epicyclic gear provided with planet pinions formed as a hollow cylindrical body and having inwardly open cells formed by inner blades with masses of mercury reacting against said blades, the arrangement of flexible blades so that the flexure of said blades varies the useful capacity of the active cells inversely proportional to the angular speed of the pinions, the whole mass of mercury acting in a pinion remaining constant.

ALPHONSE DE MUYNCK.